US012731724B2

(12) United States Patent
Noguchi et al.

(10) Patent No.: US 12,731,724 B2
(45) Date of Patent: Sep. 8, 2026

(54) COIL COMPONENT

(71) Applicant: Murata Manufacturing Co., Ltd., Kyoto-fu (JP)

(72) Inventors: Yutaka Noguchi, Nagaokakyo (JP); Minoru Gibu, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 890 days.

(21) Appl. No.: 18/153,451

(22) Filed: Jan. 12, 2023

(65) Prior Publication Data

US 2023/0230755 A1 Jul. 20, 2023

(30) Foreign Application Priority Data

Jan. 14, 2022 (JP) ................................ 2022-004581
Oct. 11, 2022 (JP) ................................ 2022-163362

(51) Int. Cl.
*H01F 27/29* (2006.01)
*H01F 27/255* (2006.01)
*H01F 41/02* (2006.01)

(52) U.S. Cl.
CPC ......... *H01F 27/292* (2013.01); *H01F 27/255* (2013.01); *H01F 41/0246* (2013.01)

(58) Field of Classification Search
CPC ................. H01F 27/292; H01F 27/255; H01F 2017/048; H01F 17/0013; H01F 17/04; H01F 2027/2809
See application file for complete search history.

(56) References Cited

U.S. PATENT DOCUMENTS 9,984,805 B2 * 5/2018 Kudo .................. H01F 17/0013
10,658,103 B2 * 5/2020 Seino ........................ H01F 1/26
2013/0200970 A1 * 8/2013 Ogawa ...................... H01F 1/22 336/83
2014/0292142 A1 * 10/2014 Nishisaka ................ C03C 8/18 336/200

(Continued)

FOREIGN PATENT DOCUMENTS

JP 2013-084701 A 5/2013
JP 2015-065363 A 4/2015

(Continued)

*Primary Examiner* — Mang Tin Bik Lian
(74) *Attorney, Agent, or Firm* — Studebaker Brackett PLLC

(57) ABSTRACT

A coil component includes a magnetic body containing metal magnetic particles; a coil embedded in the magnetic body; and an outer electrode at at least the bottom surface (for example, a first main surface) of the magnetic body and electrically connected to the coil. The outer electrode (for example, a first outer electrode) includes, in order from the side of the magnetic body, an underlayer containing Ag, and a plating layer. At an interface between the magnetic body and the underlayer, an oxide film containing a metal element contained in metal magnetic particles is between the metal magnetic particles and the underlayer. In the inside of the magnetic body, an oxide film having a thickness smaller than the thickness of the oxide film between the metal magnetic particles and the underlayer is at surfaces of metal magnetic particles adjacent to the metal magnetic particles positioned at the interface.

8 Claims, 6 Drawing Sheets

(56) References Cited

U.S. PATENT DOCUMENTS

| | | | | |
|---|---|---|---|---|
| 2016/0035476 | A1* | 2/2016 | Mimura | H01F 27/327 336/199 |
| 2018/0166202 | A1* | 6/2018 | Ishida | H01G 4/2325 |
| 2020/0312498 | A1* | 10/2020 | Takadate | H01F 27/32 |
| 2021/0098181 | A1* | 4/2021 | Araki | H01F 17/04 |
| 2021/0304950 | A1* | 9/2021 | Takahashi | H01F 27/2804 |
| 2022/0102062 | A1* | 3/2022 | Wakabayashi | H01F 41/10 |
| 2022/0301763 | A1* | 9/2022 | Teshigawara | H01F 1/147 |

FOREIGN PATENT DOCUMENTS

| | | | |
|---|---|---|---|
| JP | 2019-176109 | A | 10/2019 |
| JP | 2021-163874 | A | 10/2021 |

* cited by examiner

COIL COMPONENT

CROSS-REFERENCE TO RELATED APPLICATIONS

This application claims benefit of priority to Japanese Patent Application No. 2022-163362, filed Oct. 11, 2022, and to Japanese Patent Application No. 2022-004581, filed Jan. 14, 2022, the entire content of each is incorporated herein by reference.

BACKGROUND

Technical Field

The present disclosure relates to a coil component.

Background Art

Japanese Unexamined Patent Application Publication No. 2019-176109 discloses a passive component that is a surface mount device. The passive component includes a base portion having insulation properties, an inside conductor incorporated in the base portion, and an outer electrode that is provided at a mount surface of the base portion and that is electrically connected to the inside conductor. The outer electrode has a surface that is substantially parallel to the mount surface of the base portion, and a dome-shaped projection that protrudes with respect to the substantially parallel surface toward a side opposite to the mount surface of the base portion.

Japanese Unexamined Patent Application Publication No. 2013-84701 discloses an electronic component including a base, and an electrode that is provided at a surface of the base and that includes a baked electrode formed by subjecting an electrode paste containing a predetermined electrode material to baking treatment. In the base, glass components derived from glass frit contained in the electrode paste diffuse by substantially 10 μm or more in an inward direction of the base from an interface that the electrode is in contact with.

SUMMARY

Japanese Unexamined Patent Application Publication No. 2019-176109 describes a coil component as one example of the passive component. Japanese Unexamined Patent Application Publication No. 2019-176109 further describes that the base portion is constituted by, for example, a ferrite material of a Ni—Zn base, a Mn—Zn base, or the like, a soft magnetic alloy material of a Fe—Si—Cr base, a Fe—Si—Al base, a Fe—Si—Cr—Al base, or the like, a magnetic metal material of Fe, Ni, or the like, an amorphous magnetic metal material, a nanocrystalline magnetic metal material, or a magnetic material of a resin or the like containing metal magnetic particles, and describes that the outer electrode is constituted by, for example, a plurality of metal layers.

There is a likelihood of close contact between the base portion and the outer electrode being not sufficiently ensured in the coil component disclosed in Japanese Unexamined Patent Application Publication No. 2019-176109.

Meanwhile, Japanese Unexamined Patent Application Publication No. 2013-84701 discloses a technology of improving close contact (adhesion strength) between the base and the electrode by subjecting glass components contained in an electrode paste to baking treatment to cause the glass components to diffuse in the inside of the base. Conductor resistance is, however, increased as a result of the glass components being contained in the electrode paste.

Accordingly, the present disclosure provides a coil component capable of improving close contact between a magnetic body and an outer electrode while maintaining direct-current resistance to be low.

A coil component according to the present disclosure includes a magnetic body containing a metal magnetic particle; a coil embedded in the inside of the magnetic body; and an outer electrode provided at at least the bottom surface of the magnetic body and electrically connected to the coil. The outer electrode includes, in order from the side of the magnetic body, an underlayer containing Ag, and a plating layer. An oxide film containing a metal element contained in the metal magnetic particle is present between the metal magnetic particle and the underlayer at the interface between the magnetic body and the underlayer. In the inside of the magnetic body, an oxide film having a thickness smaller than the thickness of the oxide film present between the metal magnetic particle and the underlayer is present at a surface of a metal magnetic particle adjacent to the metal magnetic particle positioned at the interface.

According to the present disclosure, it is possible to provide a coil component capable of improving close contact between a magnetic body and an outer electrode while maintaining direct-current resistance to be low.

DETAILED DESCRIPTION

Figure 1:
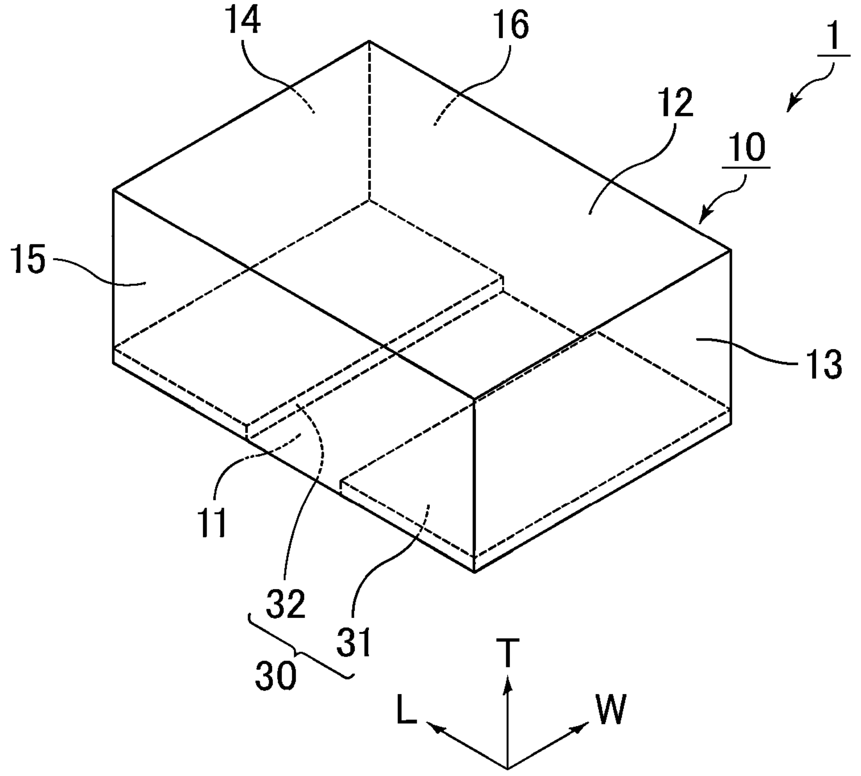
FIG. 1 is a schematic perspective view of one example of a coil component according to the present disclosure.

Hereinafter, a coil component according to the present disclosure will be described.

The present disclosure is, however, not limited to the following embodiment and is applicable by being changed, as appropriate, within a range in which the gist of the present disclosure is not changed. Combinations of two or more of the following individual desirable configurations of the present disclosure described below are also included in the present disclosure.

In the present specification, terms (for example, "parallel", "perpendicular", and "orthogonal") indicating relationships between components and terms indicating the shapes of the components are not expressions that indicate only strict meanings. The terms are expressions that are intended to include substantially equivalent ranges, for example, differences of about several percent.

The drawings described below are schematic views, and dimensions, the scale of the aspect ratio, and the like in the drawings may differ from those of actual products.

Figure 2:
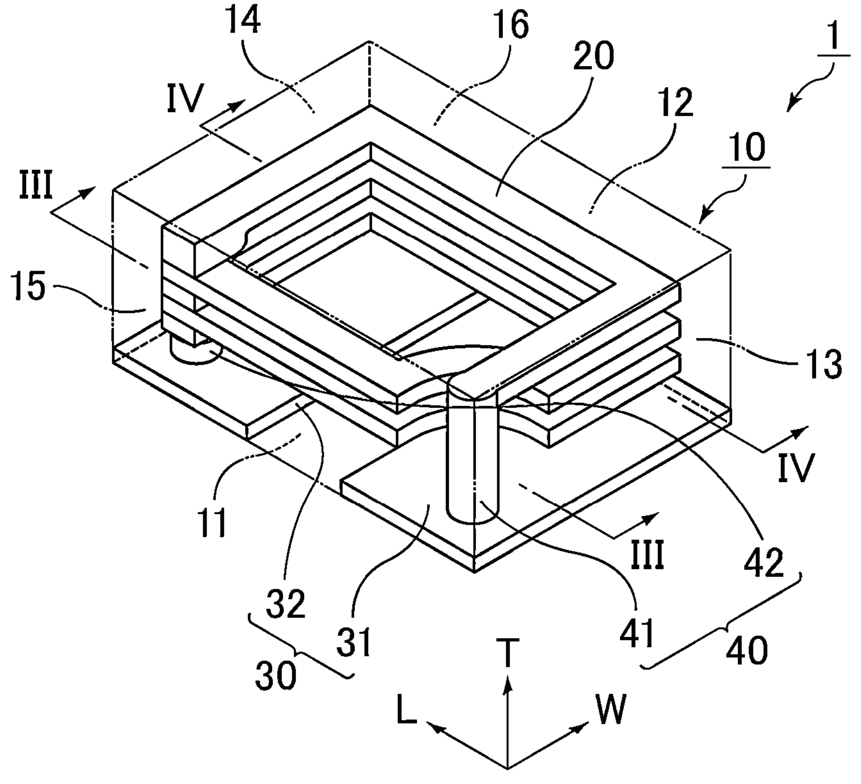
FIG. 2 is a schematic perspective view of one example of an internal structure of the coil component illustrated in FIG. 1.

FIG. 1 is a schematic perspective view of one example of a coil component according to the present disclosure. FIG. 2 is a schematic perspective view of one example of an internal structure of the coil component illustrated in FIG. 1. Note that shapes, arrangements, and the like of the coil component and constituents are not limited to illustrated examples.

A coil component 1 illustrated in FIG. 1 and FIG. 2 includes a magnetic body 10, a coil 20, and an outer electrode 30. As illustrated in FIG. 2, the coil component 1 may further include an extended conductor 40.

The magnetic body 10 has, for example, a rectangular parallelepiped shape or substantially rectangular parallelepiped shape having six surfaces. The magnetic body 10 may be rounded at corner portions and ridge portions thereof. The corner portions are each a portion where three surfaces of the magnetic body 10 meet each other, and the ridge portions are each a portion where two surfaces of the magnetic body 10 meet each other.

In FIG. 1 and FIG. 2, the length direction, the width direction, and the height direction of the coil component 1 and the magnetic body 10 are indicated as the L direction, the W direction, and the T direction, respectively. The length direction L, the width direction W, and the height direction T are orthogonal to each other. A mount surface of the coil component 1 is, for example, a surface (LW surface) parallel to the length direction L and the width direction W.

The magnetic body 10 illustrated in FIG. 1 and FIG. 2 has a first main surface 11 and a second main surface 12 facing each other in the height direction T, a first end surface 13 and a second end surface 14 facing each other in the length direction L orthogonal to the height direction T, and a first side surface 15 and a second side surface 16 facing each other in the width direction W orthogonal to the length direction L and the height direction T. In the example illustrated in FIG. 1 and FIG. 2, the first main surface 11 of the magnetic body 10 corresponds to the bottom surface of the magnetic body 10.

Figure 3:
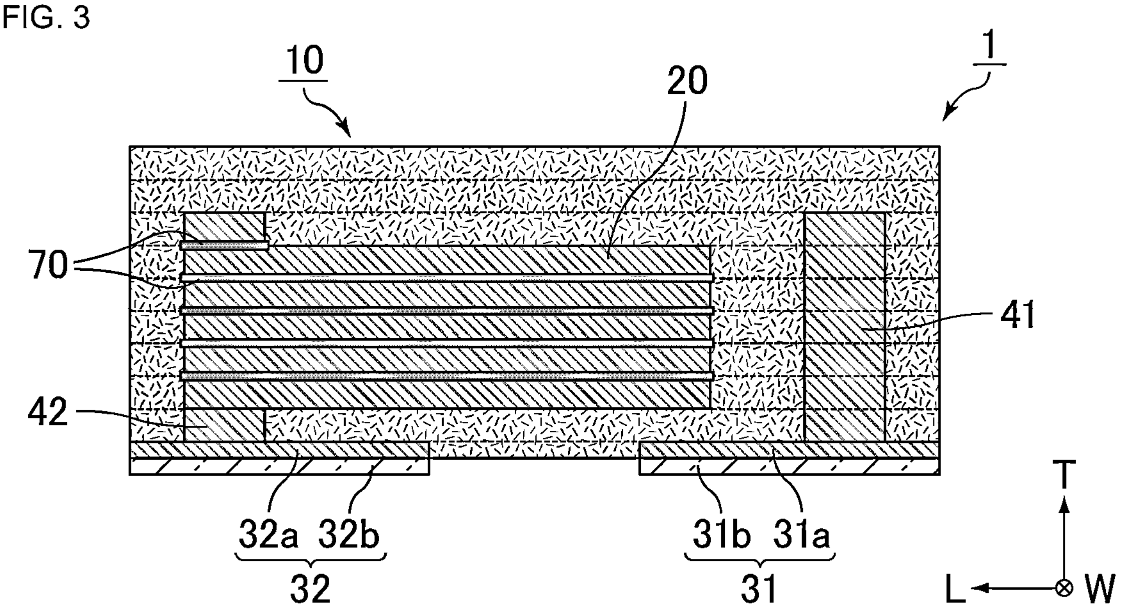
FIG. 3 is a sectional view of the coil component illustrated in FIG. 2 along line III-III.
Figure 4:
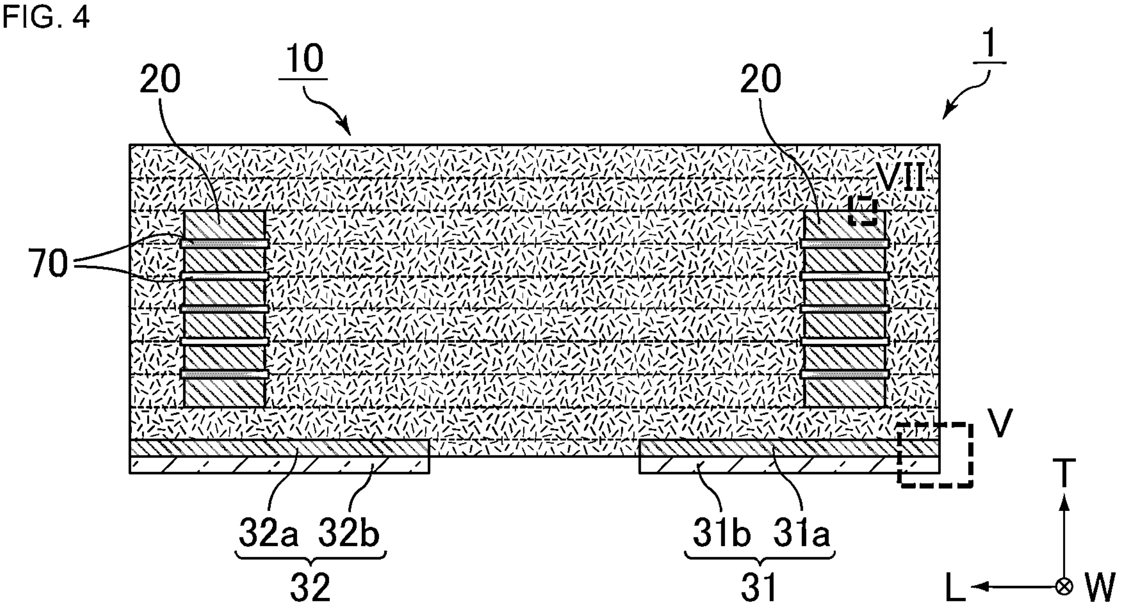
FIG. 4 is a sectional view of the coil component illustrated in FIG. 2 along line IV-IV.
Figure 5:
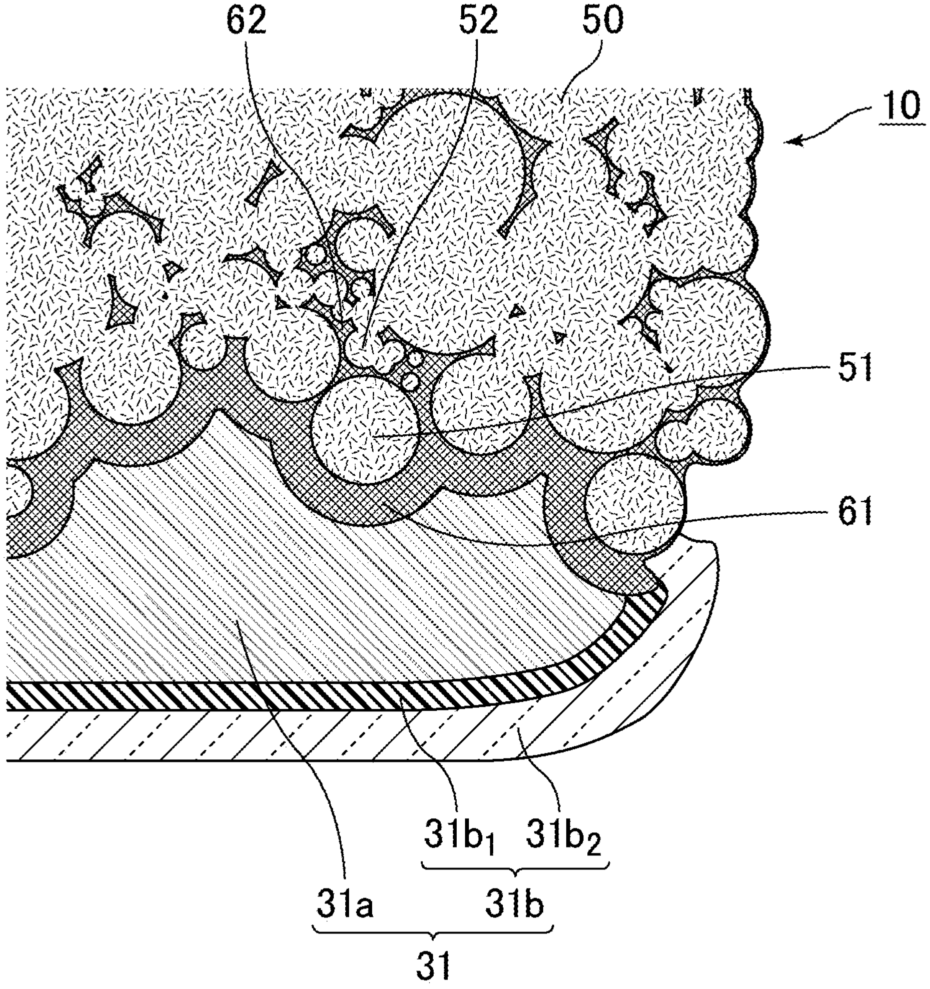
FIG. 5 is an enlarged schematic view of the portion marked with V in FIG. 4.

FIG. 3 is a sectional view of the coil component illustrated in FIG. 2 along line III-III. FIG. 4 is a sectional view of the coil component illustrated in FIG. 2 along line IV-IV. FIG. 5 is an enlarged schematic view of the portion marked with V in FIG. 4.

As illustrated in FIG. 3 and FIG. 4, the magnetic body 10 preferably has a multilayer structure. In the example illustrated in FIG. 3 and FIG. 4, the laminate direction of the magnetic body 10 is along the height direction T. Note that boundaries between layers of the multilayer structure of the magnetic body 10 are illustrated for convenience of description in FIG. 3 and FIG. 4, but actually do not appear clearly.

When the magnetic body 10 has the multilayer structure, flexibility in design of the coil component 1 is increased. For example, it is easy when the magnetic body 10 has the multilayer structure to extend the coil 20 to the bottom surface side in manufacture of the coil component 1 that includes the outer electrode 30 at the bottom surface (first main surface 11) of the magnetic body 10.

As illustrated in FIG. 5, the magnetic body 10 contains metal magnetic particles 50.

Examples of the metal magnetic material that constitutes the metal magnetic particles 50 are alloys containing Fe and Si, such as a Fe—Si alloy and a Fe—Si—Cr alloy. These alloys may contain, as impurities, elements of Cr, Mn, Cu, Ni, P, S, and the like.

Although not particularly limited, the average particle diameter of the metal magnetic particles 50 is preferably 1 μm or more and 50 μm or less (i.e., from 1 μm to 50 μm) and more preferably 2 μm or more and 20 μm or less (i.e., from 2 μm to 20 μm).

The average particle diameter of the metal magnetic particles 50 can be measured by the method described below. First, a section is formed by cutting the coil component 1. For example, when the coil component 1 includes the outer electrode 30 at the bottom surface (first main surface 11) of the magnetic body 10, the coil component 1 is cut in the height direction T perpendicular to the bottom surface, thereby forming a section perpendicular to the bottom surface. The section is processed by ion milling. The section after processing is observed with a scanning electron microscope (SEM). The magnification of the SEM is preferably set to about 500 times or more and 5000 times or less (i.e., from about 500 times to 5000 times). The particle diameters (equivalent circle diameters) of the metal magnetic particles 50 are measured in an obtained SEM image, and an average value of the particle diameters of 100 or more pieces of the metal magnetic particles 50 can be considered as the average particle diameter of the metal magnetic particles 50.

The average particle diameter of the metal magnetic particles 50 contained in the coil component 1 as a finished product may be considered to be substantially identical to the average particle diameter of metal magnetic powder as a raw material. The average particle diameter of the metal magnetic powder as the raw material can be obtained by measuring a volume-based cumulative 50% particle diameter (median diameter) D50 by a laser diffraction/scattering method.

Surfaces of the metal magnetic particles 50 are provided with an insulative coating. In this case, insulation properties of the magnetic body 10 are improved, and consequently, withstand voltage properties of the coil component 1 can be further improved. The insulative coating is an oxide film containing a metal oxide and preferably further includes an oxide film containing an oxide of Si.

The magnetic body 10 may further contain components other than the metal magnetic particles 50. For example, the magnetic body 10 may contain, as an element that is more easily oxidized than Fe, at least one of elements of Cr, Al, Li, Zn, and the like.

The magnetic body 10 may further contain a resin. When the magnetic body 10 contains a resin, the type of the resin is not particularly limited and can be selected, as appropriate, in accordance with desired characteristics. The magnetic body 10 may contain, for example, one or more types of resins selected from a group consisting of an epoxy resin, a phenolic resin, a polyester resin, a polyimide resin, a polyolefin resin, a silicone resin, an acrylic resin, a polyvinyl butyral resin, a cellulose resin, an alkyd resin, and the like.

The coil 20 is embedded in the inside of the magnetic body 10. As illustrated in FIG. 2, FIG. 3, and FIG. 4, the coil 20 may include a plurality of coil conductor layers laminated in a winding axis direction. In the example illustrated in FIG. 2, FIG. 3, and FIG. 4, the winding axis direction of the coil 20 is along the height direction T. Although not illustrated, the coil conductor layers adjacent to each other are connected together with a via conductor interposed therebetween.

The outer electrode 30 is provided at at least the bottom surface (first main surface 11) of the magnetic body 10 and electrically connected to the coil 20. In the coil component 1, the bottom surface (first main surface 11) of the magnetic body 10 can serve as a mount surface. In other words, mounting on the bottom surface of the coil component 1 is possible.

The outer electrode 30 includes, for example, a first outer electrode 31 and a second outer electrode 32.

The first outer electrode 31 is disposed to cover a portion of the first main surface 11 of the magnetic body 10. Although not illustrated in FIG. 1 and the other figures, the first outer electrode 31 may be disposed to extend from the first main surface 11 of the magnetic body 10 and cover a portion of the first end surface 13, a portion of the first side surface 15, or a portion of the second side surface 16.

The second outer electrode 32 is disposed to cover a portion of the first main surface 11 of the magnetic body 10. Although not illustrated in FIG. 1 and the other figures, the second outer electrode 32 may be disposed to extend from the first main surface 11 of the magnetic body 10 and cover a portion of the second end surface 14, a portion of the first side surface 15, or a portion of the second side surface 16.

The outer electrode 30 includes an underlayer and a plating layer in order from the side of the magnetic body 10. In the example illustrated in FIG. 3 and FIG. 4, the first outer electrode 31 includes an underlayer 31*a* and a plating layer 31*b* in order from the side of the magnetic body 10, and the second outer electrode 32 includes an underlayer 32*a* and a plating layer 32*b* in order from the side of the magnetic body 10.

The underlayer of the outer electrode 30 is a base electrode containing Ag.

The underlayer of the outer electrode 30 preferably does not contain a glass component. For example, by forming the underlayer with an Ag paste that does not contain glass frit, it is possible to suppress an increase in conductor resistance.

Note that "does not contain glass frit" means that the content of the glass component is equal to or less than a detection limit. Presence/absence of the glass component contained in the underlayer is confirmed by, for example, performing mapping element analysis by energy dispersive X-ray analysis (EDX) and determining whether an element (for example, silicon (Si)) constituting glass is detected.

The plating layer of the outer electrode 30 is provided to cover the underlayer. The plating layer may be a single layer or two or more layers. In the example illustrated in FIG. 5, the plating layer 31*b* of the first outer electrode 31 includes a first plating layer $\mathbf{31}b_1$ and a second plating layer $\mathbf{31}b_2$ in order from the side of the underlayer 31*a*. The same applies to the plating layer 32*b* of the second outer electrode 32.

As illustrated in FIG. 2 and FIG. 3, both ends of the coil 20 are preferably extended to the bottom surface (first main surface 11) of the magnetic body 10. Specifically, the coil 20 is preferably electrically connected, at the bottom surface (first main surface 11) of the magnetic body 10, to the outer electrode 30 with the extended conductor 40 interposed therebetween.

One end portion of the extended conductor 40 is connected, in the inside of the magnetic body 10, to the coil 20. The other end portion of the extended conductor 40 is connected, at the bottom surface (first main surface 11) of the magnetic body 10, to the outer electrode 30.

The extended conductor 40 includes, for example, a first extended conductor 41 and a second extended conductor 42.

One end portion of the first extended conductor 41 is connected to the starting end of the coil 20. The other end portion of the first extended conductor 41 is connected to the first outer electrode 31. In the example illustrated in FIG. 2 and FIG. 3, the direction extending from one end portion to the other end portion of the first extended conductor 41 is along the height direction T.

As illustrated in FIG. 3, the first extended conductor 41 may have a multilayer structure. In the example illustrated in FIG. 3, the laminate direction of the first extended conductor 41 is along the height direction T. Note that boundaries between layers of the multilayer structure of the first extended conductor 41 are illustrated for convenience of description in FIG. 3, but actually do not appear clearly.

One end portion of the second extended conductor 42 is connected to the terminal end of the coil 20. The other end portion of the second extended conductor 42 is connected to the second outer electrode 32. In the example illustrated in FIG. 2 and FIG. 3, the direction extending from one end portion to the other end portion of the second extended conductor 42 is along the height direction T.

Although not illustrated, the second extended conductor 42 may have a multilayer structure.

As illustrated in FIG. 5, in the metal magnetic particles 50 contained in the magnetic body 10, when metal magnetic particles 51 positioned at an interface between the magnetic body 10 and the underlayer 31*a* are focused, an oxide film 61 is present between the metal magnetic particles 51 and the underlayer 31*a* at the interface between the magnetic body 10 and the underlayer 31*a*. The oxide film 61 may be present at the entirety of the interface between the magnetic body 10 and the underlayer 31*a* or present at a portion thereof.

Although not illustrated, in the metal magnetic particles 50 contained in the magnetic body 10, when the metal magnetic particles 51 positioned at an interface between the magnetic body 10 and the underlayer 32*a* are focused, the oxide film 61 is preferably present between the metal magnetic particles 51 and the underlayer 32*a* at the interface between the magnetic body 10 and the underlayer 32*a*. In such a case, the oxide film 61 may be present at the entirety of the interface between the magnetic body 10 and the underlayer 32*a* or present at a portion thereof.

The oxide film 61 may be present at only either one of the interface between the magnetic body 10 and the underlayer 31*a* and the interface between the magnetic body 10 and the underlayer 32*a*. The oxide film 61 also may be present at both of the interfaces.

The oxide film 61 contains a metal element contained in the metal magnetic particles 51. For example, when the metal magnetic particles 51 contain Fe and Si, the oxide film 61 may be an oxide film containing an oxide of Fe, may be an oxide film containing an oxide of Si, and may be an oxide film containing oxides of Fe and Si. The composition of the oxide film 61 is not necessarily uniform, and, for example, a portion containing an oxide of Fe, a portion containing an oxide of Si, and a portion containing oxides of Fe and Si may coexist in the oxide film 61.

Figure 6A:
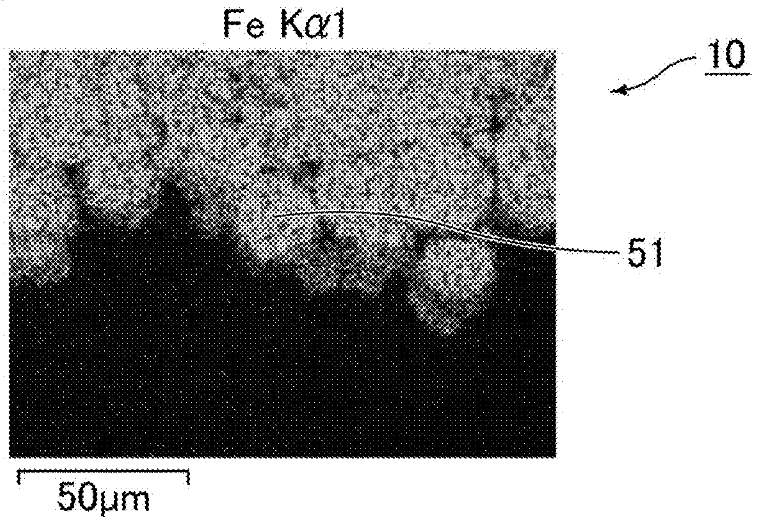
FIG. 6A is a mapping image of a Fe element in the portion illustrated in FIG. 5.
Figure 6B:
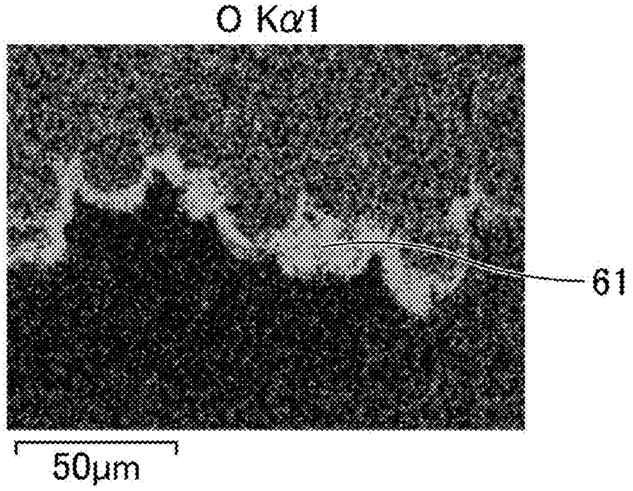
FIG. 6B is a mapping image of an O element in the portion illustrated in FIG. 5.
Figure 6C:
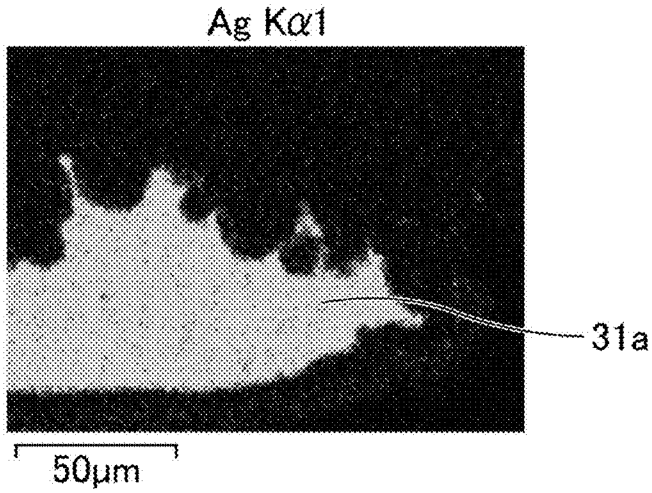
FIG. 6C is a mapping image of an Ag element in the portion illustrated in FIG. 5.

FIG. 6A is a mapping image of a Fe element in the portion illustrated in FIG. 5. FIG. 6B is a mapping image of an O element in the portion illustrated in FIG. 5. FIG. 6C is a mapping image of an Ag element in the portion illustrated in FIG. 5.

FIG. 6A, FIG. 6B, and FIG. 6C are mapping images of elements obtained through measurement by SEM-EDX. From FIG. 6A, FIG. 6B, and FIG. 6C, it can be confirmed that, at the interface between the magnetic body 10 and the underlayer 31*a*, the oxide film 61 is present between the metal magnetic particles 51 and the underlayer 31*a*.

The thicknesses of the oxide film 61 is not particularly limited and is, for example, 50 nm or more. The thickness of the oxide film 61 is preferably 75 nm or more, more preferably 100 nm or more, further preferably 200 nm or more, and particularly preferably 1 μm or more. Meanwhile, the thickness of the oxide film 61 is, for example, 2 μm or less. The thickness of the oxide film 61 may be constant or inconstant. When the thicknesses of the oxide film 61 is inconstant, a portion in which, for example, the thicknesses of the oxide film 61 is 50 nm or more may be present.

In the coil component 1, due to the presence of the oxide film 61 containing the metal element contained in the metal magnetic particles 51 at the interface between the magnetic body 10 and the underlayer of the outer electrode 30, the strength of the close contact between the magnetic body 10 and the outer electrode 30 is increased.

Since it is possible, as described above, to improve the close contact between the magnetic body 10 and the outer electrode 30 by the oxide film 61 in the coil component 1, it is possible, differently from the technology described in Japanese Unexamined Patent Application Publication No. 2013-84701, to form an underlayer that does not contain a glass component. It is thus possible to suppress an increase in conductor resistance. Accordingly, it is possible to improve the close contact between the magnetic body 10 and the outer electrode 30 while maintaining direct-current resistance to be low.

For example, when the metal magnetic particles 51 contain Fe and Si, Fe contained in the metal magnetic particles 51 tends to be ionized more easily than Ag contained in the underlayer of the outer electrode 30, and thus is easily oxidized. Meanwhile, since Ag is easily reduced, the oxide film 61 that is thick is formed at surfaces of the metal magnetic particles 51 in the vicinity of the underlayer of the outer electrode 30.

Therefore, as illustrated in FIG. 5, the oxide film 61 present between the metal magnetic particles 51 and the underlayer 31*a* is preferably present at, of the surfaces of the metal magnetic particles 51 positioned at the interface between the magnetic body 10 and the underlayer 31*a*, surfaces on the side of the underlayer 31*a*. Similarly, the oxide film 61 present between the metal magnetic particles 51 and the underlayer 32*a* is preferably present at, of the surfaces of the metal magnetic particles 51 positioned at the interface between the magnetic body 10 and the underlayer 32*a*, surfaces on the side of the underlayer 32*a*.

The thickness of the oxide film 61 can be measured by the method described below. First, a section is formed by cutting the coil component 1 and is processed by ion milling. The section after processing is observed with a scanning transmission electron microscope (STEM). Mapping element analysis by energy dispersive X-ray analysis (EDX) is performed, and a range in which oxygen (O) is detected is considered as the thickness of the oxide film 61. The magnification is preferably set to about 10000 times or more and 500000 times or less (i.e., from about 10000 times to 500000 times). The thicknesses of later-described oxide films 62 and 63 are measured by the same method.

The oxide film 61 may further contain elements other than the metal element contained in the metal magnetic particles 51. For example, the oxide film 61 may contain at least one of elements of Cr, Al, Li, Zn, and the like.

For example, when the oxide film 61 present between the metal magnetic particles 51 and the underlayer 31*a* contains Zn, the Zn contained in the oxide film 61 is preferably unevenly distributed on the side of the underlayer 31*a*. Similarly, when the oxide film 61 present between the metal magnetic particles 51 and the underlayer 32*a* contains Zn, the Zn contained in the oxide film 61 is preferably unevenly distributed on the side of the underlayer 32*a*. When the Zn is unevenly distributed on the side of the underlayer 31*a* or the side of the underlayer 32*a*, insulation between the metal magnetic particles 51 and the underlayer 31*a* or the underlayer 32*a* is improved, and the withstand voltage of the coil component 1 thus can be further improved.

Whether the Zn contained in the oxide film 61 is unevenly distributed on the side of the underlayer 31*a* or the side of the underlayer 32*a* can be confirmed by performing the above-described mapping element analysis by EDX and confirming a range in which zinc (Zn) is detected between the metal magnetic particles 51 and the underlayer 31*a* or the underlayer 32*a*. In the present disclosure, "the Zn contained in the oxide film 61 is unevenly distributed on the side of the underlayer 31*a* or the side of the underlayer 32*a*" means that, as a result of the above-described mapping element analysis, the maximum peak of Zn is positioned on the side of the underlayer 31*a* or the side of the underlayer 32*a* with respect to the center between the metal magnetic particles 51 and the underlayer 31*a* or the center between the metal magnetic particles 51 and the underlayer 32*a*.

As illustrated in FIG. 5, a portion of the underlayer 31*a* may be interposed between the metal magnetic particles 51 adjacent to each other at the interface between the magnetic body 10 and the underlayer 31*a*. Similarly, a portion of the underlayer 32*a* may be interposed between the metal magnetic particles 51 adjacent to each other at the interface between the magnetic body 10 and the underlayer 32*a*. In such a case, the strength of the close contact between the magnetic body 10 and the outer electrode 30 is increased by an anchor effect.

As illustrated in FIG. 5, the oxide film 62 is preferably present at surfaces of, among the metal magnetic particles 50 contained in the magnetic body 10, metal magnetic particles 52 adjacent to the metal magnetic particles 51 positioned at the interface between the magnetic body 10 and the underlayer 31*a* or the underlayer 32*a* in the inside of the magnetic body 10.

The thickness of the oxide film 62 is smaller than the thickness of the oxide film 61 present between the metal magnetic particles 51 and the underlayer 31*a* or the underlayer 32*a*. Consequently, it is possible to achieve both an improvement in the strength of the close contact and suppression of degradation in characteristics due to oxidation. The surfaces of the metal magnetic particles 50 are originally provided with an oxide film of a metal element derived from the metal magnetic particles 50. By degreasing and firing the oxide film, the thickness of the oxide film is caused to be different depending on positions where the metal magnetic particles 50 are present, and it is thus possible to cause the thickness of the oxide film 62 to be smaller than the thickness of the oxide film 61.

The oxide film 62 contains, for example, a metal element contained in the metal magnetic particles 52. The composition of the oxide film 62 may be identical to the composition of the oxide film 61 and may differ therefrom.

Figure 7:
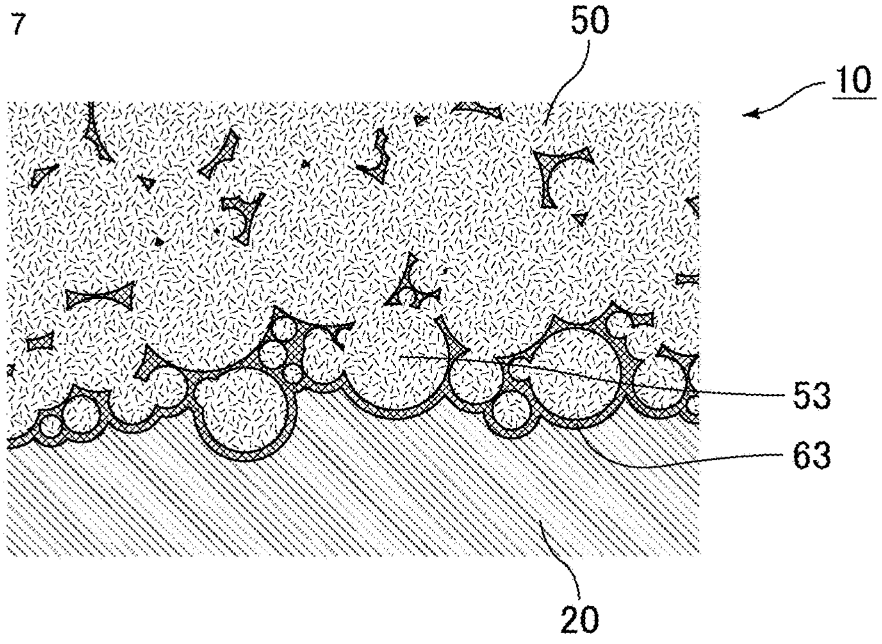
FIG. 7 is an enlarged schematic view of the portion marked with VII in FIG. 4.

FIG. 7 is an enlarged schematic view of the portion marked with VII in FIG. 4.

As illustrated in FIG. 7, in the metal magnetic particles 50 contained in the magnetic body 10, when metal magnetic particles 53 positioned at the interface between the magnetic body 10 and the coil 20 are focused, the oxide film 63 may be present between the metal magnetic particles 53 and the coil 20 at the interface between the magnetic body 10 and the coil 20. The oxide film 63 present between the metal magnetic particles 53 and the coil 20 is preferably present at, of the surfaces of the metal magnetic particles 53 positioned at the interface between the magnetic body 10 and the coil 20, surfaces on the side of the coil 20.

The thickness of the oxide film 63 is smaller than the thickness of the oxide film 61 present between the metal magnetic particles 51 and the underlayer 31*a* or the underlayer 32*a*. Consequently, it is possible to achieve both an improvement in the strength of the close contact and suppression of degradation in characteristics due to oxidation.

The oxide film 63 contains, for example, a metal element contained in the metal magnetic particles 53. The composition of the oxide film 63 may be identical to the composition of the oxide film 61 and may differ therefrom. The composition of the oxide film 63 may be identical to the composition of the oxide film 62 and may differ therefrom.

As illustrated in FIG. 2 and FIG. 3, the coil component 1 may further include an insulating layer 70.

In the example illustrated in FIG. 2 and FIG. 3, the insulating layer 70 is provided between the plurality of coil conductor layers constituting the coil 20. As a result of the insulating layer 70 being disposed between the coil conductor layers, it is possible to suppress short circuit that occurs between the coil conductor layers and thus is possible to improve reliability of the coil component 1.

In the example illustrated in FIG. 2 and FIG. 3, the insulating layer 70 is disposed at only a position where the insulating layer 70 overlaps the coil conductor layers when viewed in the height direction T. Arrangement of the insulating layer 70 is not particularly limited and may be also provided at a position where the insulating layer 70 does not overlap the coil conductor layers when viewed in the height direction T. As illustrated in FIG. 2 and FIG. 3, the insulating layer 70 is preferably disposed in each of gaps between the coil conductor layers adjacent to each other, from the point of view of suppressing short circuit.

The material that constitutes the insulating layer 70 is not particularly limited as long as the material is a material having insulation properties higher than the insulation properties of the magnetic body 10, and examples of the material that constitutes the insulating layer 70 are a nonmagnetic material, a ferrite material, a metal magnetic material, and the like.

The coil component according to the present disclosure is manufactured by, for example, the following method.

Hereinafter, one example of the method of manufacturing the coil component 1 by using a printing laminate method will be described. The coil component according to the present disclosure may be manufactured by printing laminate method and may be manufactured by sheet laminate method.

First, a magnetic paste is prepared.

For example, metal magnetic powder of a Fe—Si alloy, a Fe—Si—Cr alloy, or the like whose volume-based cumulative 50% particle diameter D50 is 2 μm or more and 20 μm or less (i.e., from 2 μm to 20 μm) (preferably, about 10 μm) is prepared. The metal magnetic powder is added with a binding agent of cellulose, polyvinyl butyral (PVB), or the like and a solvent of terpineol, butyl diglycol acetate (BCA), or the like, and kneaded to produce a magnetic paste containing metal magnetic particles. The metal magnetic powder may be added with, as a component other than the metal magnetic powder, oxide powder of Cr, Al, Li, Zn, or the like and kneaded.

When a Fe—Si alloy is used as the metal magnetic powder, the content of Si is preferably 2.0 at % or more and 8.0 at % or less (i.e., from 2.0 at % to 8.0 at %). When a Fe—Si—Cr alloy is used as the metal magnetic powder, the content of Si is preferably 2.0 at % or more and 8.0 at % or less (i.e., from 2.0 at % to 8.0 at %), and the content of Cr is preferably 0.2 at % or more and 6.0 at % or less (i.e., from 0.2 at % to 6.0 at %).

The surface of the metal magnetic powder is provided with an insulative coating. The insulative coating is an oxide film containing a metal oxide and preferably further includes an oxide film containing an oxide of Si. Examples of the method of forming the oxide film containing the oxide of Si are a mechanochemical method, a sol-gel method, and the like. Among them, the sol-gel method is preferable. When the oxide film containing the oxide of Si is to be formed by the sol-gel method, the oxide film can be formed by, for example, mixing a sol-gel coating agent containing Si alkoxide with an organic chain-containing silane coupling agent, causing the mixture solution to adhere to the surface of the metal magnetic powder, causing the mixture solution to be dehydration bonded by heat treatment, and then drying the mixture solution at a predetermined temperature.

Separately, a conductive paste containing Ag is prepared. The conductive paste preferably does not contain glass frit.

When the insulating layer 70 is to be formed, an insulative paste containing an insulative material is further prepared.

A multilayer body block is produced by using the magnetic paste, the conductive paste, and the insulative paste described above.

Figure 8A:
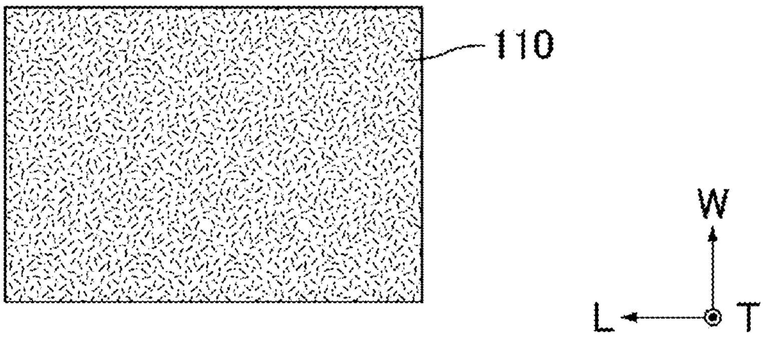
FIG. 8A is a schematic plan view of one example of the method of forming a magnetic paste layer.

FIG. 8A is a schematic plan view of one example of the method of forming a magnetic paste layer.

Although not illustrated, first, a substrate in which a thermal release sheet and a PET (polyethylene terephthalate) film are stacked on a metal plate is prepared. The magnetic paste is applied to the substrate through a screen for a predetermined number of times to form a magnetic paste layer 110. The magnetic paste layer 110 serves as the outer layer of the coil component.

Figure 8B:
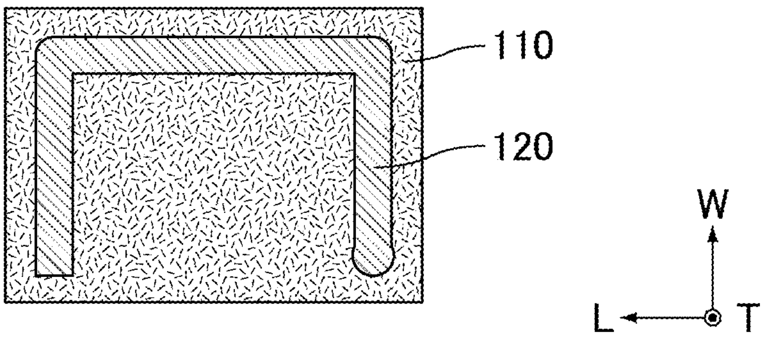
FIG. 8B is a schematic plan view of one example of the method of forming a conductive paste layer on a magnetic paste layer.

FIG. 8B is a schematic plan view of one example of the method of forming a conductive paste layer on a magnetic paste layer.

The conductive paste is applied to the magnetic paste layer 110 to form a conductive paste layer 120 that serves as a coil conductor layer of the coil 20. The magnetic paste layer 110 is further formed in a region in which the conductive paste layer 120 is not formed. The magnetic paste layer 110 and the conductive paste layer 120 may be formed to overlap each other partially at the boundary therebetween.

Figure 8C:
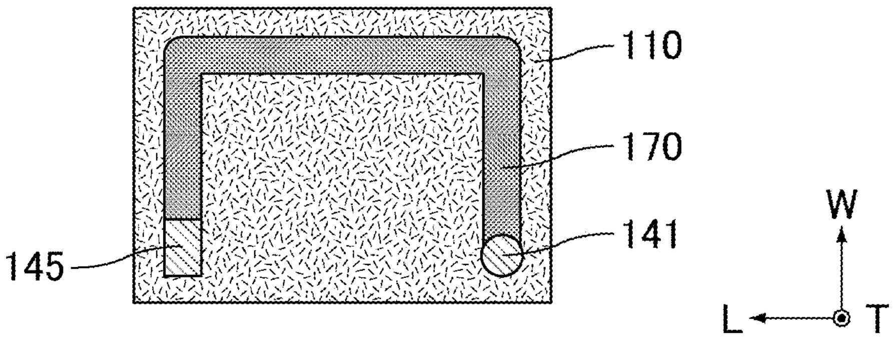
FIG. 8C is a schematic plan view of one example of the method of forming an insulative paste layer and a via conductor on a conductive paste layer.

FIG. 8C is a schematic plan view of one example of the method of forming an insulative paste layer and a via conductor on a conductive paste layer.

The insulative paste is applied to a predetermined region on the conductive paste layer 120 to form an insulative paste layer 170. The magnetic paste is further applied to a region other than a region that serves as a later-described via conductor and to a region other than the region in which the insulative paste layer 170 is formed, thereby forming the magnetic paste layer 110. In addition, a via conductor 145 and a via conductor 141 that is to be extended to the bottom surface are formed in a region connected to a coil conductor layer printed on the conductive paste layer 120 in the next step. The insulative paste layer 170, the via conductor 141, the via conductor 145, and the magnetic paste layer 110 may be formed to overlap each other partially at the boundaries therebetween.

Figure 8D:
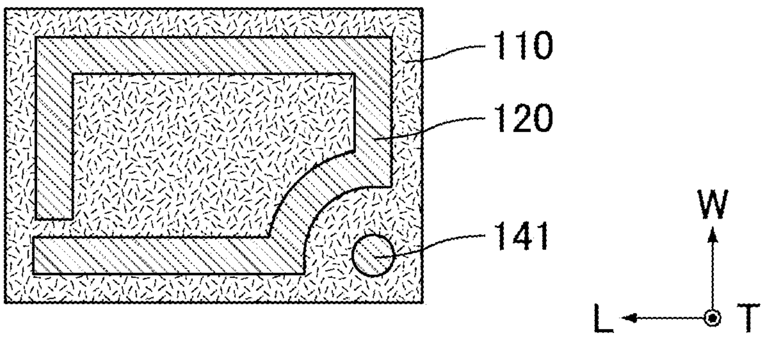
FIG. 8D is a schematic plan view of one example of the method of forming a conductive paste layer on a magnetic paste layer and an insulative paste layer.

FIG. 8D is a schematic plan view of one example of the method of forming a conductive paste layer on a magnetic paste layer and an insulative paste layer.

The conductive paste is applied to the magnetic paste layer 110 and the insulative paste layer 170 to form the conductive paste layer 120 that serves as a coil conductor layer. The conductive paste is further applied to the via conductor 141 that is to be extended to the bottom surface. The conductive paste for forming the conductive paste layer 120 and the conductive paste on the via conductor 141 are applied at the same time.

The step described with FIG. 8C and FIG. 8D is repeated a predetermined number of times.

Figure 8E:
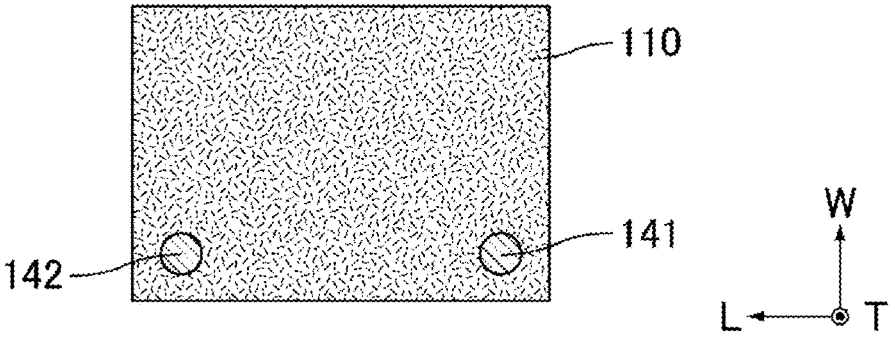
FIG. 8E is a schematic plan view of one example of the method of forming a via conductor on a conductive paste layer.

FIG. 8E is a schematic plan view of one example of the method of forming a via conductor on a conductive paste layer.

The conductive paste is applied to the conductive paste layer 120 to form the via conductor 141 and a via conductor 142 that are to be extended to the bottom surface. The magnetic paste is further applied to a region in which the via conductors 141 and 142 are not formed, thereby forming the magnetic paste layer 110.

The step described with FIG. 8E is repeated a predetermined number of times.

Figure 8F:
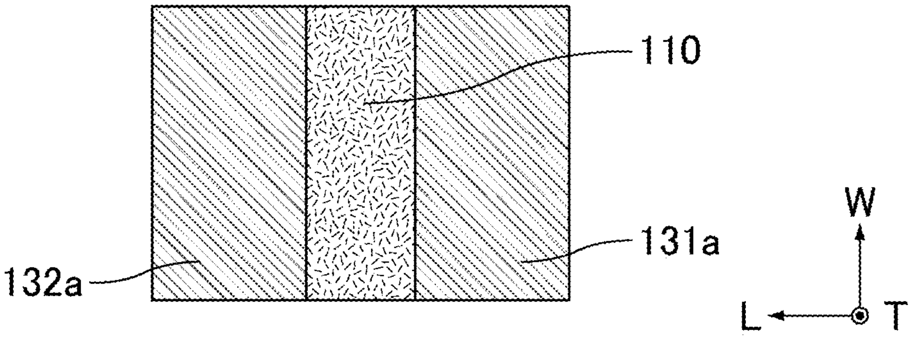
FIG. 8F is a schematic plan view of one example of the method of forming a conductive paste layer that serves as an underlayer of an outer electrode.

FIG. 8F is a schematic plan view of one example of the method of forming a conductive paste layer that serves as the underlayer of an outer electrode.

Last, a conductive paste layer that serves as the underlayer of the outer electrode 30 is formed. Specifically, a conductive paste layer 131*a* that serves as the underlayer 31*a* of the first outer electrode 31 and a conductive paste layer 132*a* that serves as the underlayer 32*a* of the second outer electrode 32 are formed. The magnetic paste layer 110 is further formed in a region in which the conductive paste layers 131*a* and 132*a* are not formed.

A multilayer body produced by the aforementioned procedure is pressurized and compressed, thereby obtaining a multilayer body block.

The multilayer body block is cut by a dicer or the like into individual pieces to obtain elements. The multilayer body block may be cut into individual pieces after fired.

After degreased, the individual pieces of the elements are placed in a firing furnace and fired under conditions of firing at 600° C. or more and 800° C. or less (i.e., from 600° C. to 800° C.) in the atmosphere for 30 minutes or more and 90 minutes or less (i.e., from 30 minutes to 90 minutes). At this time, an oxide film is formed on the surface of the metal magnetic powder contained in the magnetic paste.

As necessary, the fired individual pieces are impregnated with a resin such as an epoxy resin and thermally hardened. As a result of impregnation of the resin, gaps between the metal magnetic particles are filled with the resin, and it is thus possible to ensure the strength of the magnetic body 10 and possible to suppress infiltration of a plating solution, moisture, or the like.

A plating layer is formed at the underlayer by electrolytic plating. As the plating layer, for example, a Cu coating may be formed, a Ni coating and a Sn coating may be formed in order, or a Ni coating and a Cu coating may be formed in order. Consequently, the outer electrode 30 is formed.

The coil component 1 such as that illustrated in FIG. 1 can be produced as a result of the above. The coil component 1 has a size in which, for example, the dimension in the length direction L is 1.6 mm, the dimension in the width direction W is 0.8 mm, and the dimension in the height direction T is 0.4 mm or more and 1.0 mm or less (i.e., from 0.4 mm to 1.0 mm) (for example, 0.64 mm), and the thickness of a coil conductor layer of the coil 20 is 20 μm or more and 90 μm or less (i.e., from 20 μm to 90 μm).

Although the same conductive paste is used to form the coil 20 and the outer electrode 30 in the aforementioned example, different conductive pastes may be used to form the coil 20 and the outer electrode 30. By using different conductive pastes, it is possible to cause the oxide film 61 formed in the vicinity of the outer electrode 30 to be thicker than the oxide film 63 formed in the vicinity of the coil 20.

For example, by forming the underlayer of the outer electrode 30 with a conductive paste containing Ag particles that are easily fired, the oxide film 61 that is thick is formed in the vicinity of the outer electrode 30, and it is thus possible to improve the adhesion strength. Meanwhile, by forming a coil conductor layer of the coil 20 with a conductive paste containing Ag particles that are not easily fired, the oxide film 63 that is thin is formed in the vicinity of the coil 20, and it is thus possible to suppress degradation in characteristics due to oxidation.

As the Ag particles that are easily fired, for example, Ag particles each having a small particle diameter, Ag particles produced by a wet-reduction method, and the like are usable. As the Ag particles that are not easily fired, for example, Ag particles each having a large particle diameter, Ag particles produced by an atomizing method, and the like are usable.

The coil component according to the present disclosure is not limited to the aforementioned embodiment, and various applications and modifications can be added to the configuration, conditions of manufacture, and the like of the coil component within the scope of the present disclosure.

For example, the coil 20 may have a multilayer structure and does not necessarily have a multilayer structure.

The pattern shape of the coil 20 is not particularly limited. By changing the pattern shape of the coil 20, it is possible to adjust inductance. The pattern shape of the coil 20 may be, for example, a linear shape.

In the inside of the magnetic body 10, one coil 20 may be disposed, and a plurality of coils 20 may be disposed. By disposing a plurality of coils 20 in the inside of the magnetic body 10, it is possible to reduce the mount area and the mount number of the coil components.

When a plurality of coils 20 are disposed in the inside of the magnetic body 10, the configurations of the coils 20 may be identical to each other, and some or all of the configurations differ from each other.

When a plurality of coils 20 are disposed in the inside of the magnetic body 10, the arrangement of the coils 20 is not particularly limited. All of the plurality of coils 20 may be disposed in the same orientation, and some or all of the plurality of coils 20 may be disposed in different orientations. The plurality of coils 20 may be disposed linearly and may be disposed planarly. The plurality of coils 20 may be disposed regularly and may be disposed irregularly.

The present specification discloses the following contents.

<1> A coil component including a magnetic body containing a metal magnetic particle; a coil embedded in the inside of the magnetic body; and an outer electrode provided at at least the bottom surface of the magnetic body and electrically connected to the coil. The outer electrode includes, in order from the side of the magnetic body, an underlayer containing Ag, and a plating layer. An oxide film containing a metal element contained in the metal magnetic particle is present between the metal magnetic particle and the underlayer at an interface between the magnetic body and the underlayer. In the inside of the magnetic body, an oxide film having a thickness smaller than the thickness of the oxide film present between the metal magnetic particle and the underlayer is present at a surface of a metal magnetic particle adjacent to the metal magnetic particle positioned at the interface.

<2> The coil component described in <1>, in which the thickness of the oxide film present between the metal magnetic particle and the underlayer is 50 nm or more.

<3> The coil component described in <1>, in which the thickness of the oxide film present between the metal magnetic particle and the underlayer is 100 nm or more.

<4> The coil component described in any one of <1> to <3>, in which the oxide film present between the metal magnetic particle and the underlayer is present at a surface of the metal magnetic particle positioned at the interface between the magnetic body and the underlayer, the surface being on the side of the underlayer.

<5> The coil component described in any one of <1> to <4>, in which the underlayer does not contain a glass component.

<6> The coil component described in any one of <1> to <5>, in which the oxide film present between the metal magnetic particle and the underlayer contains Zn, and the Zn is unevenly distributed on the side of the underlayer.

<7> The coil component described in any one of <1> to <6>, in which, at an interface between the magnetic body and the coil, an oxide film having a thickness smaller than the thickness of the oxide film present between the metal magnetic particle and the underlayer is present between the metal magnetic particle and the coil.

<8> The coil component described in <7>, in which the oxide film present between the metal magnetic particle and the coil is present at a surface of the metal magnetic particle positioned at the interface between the magnetic body and the coil, the surface being on the side of the coil.

In addition, the present specification discloses the following contents.

<9> A coil component including a magnetic body containing a metal magnetic particle; a coil embedded in the inside of the magnetic body; and an outer electrode provided at at least the bottom surface of the magnetic body and electrically connected to the coil. The outer electrode includes, in order from the side of the magnetic body, an underlayer containing Ag, and a plating layer. An oxide film containing a metal element contained in the metal magnetic particle is present between the metal magnetic particle and the underlayer at an interface between the magnetic body and the underlayer, and the thickness of the oxide film present between the metal magnetic particle and the underlayer is 50 nm or more.

<10> The coil component described in <9>, in which the thickness of the oxide film present between the metal magnetic particle and the underlayer is 100 nm or more.

<11> The coil component described in <9> or <10>, in which the oxide film present between the metal magnetic particle and the underlayer is present at a surface of the metal magnetic particle positioned at the interface between the magnetic body and the underlayer, the surface being on the side of the underlayer.

<12> The coil component described in any one of <9> to <11>, in which, in the inside of the magnetic body, an oxide film having a thickness smaller than the thickness of the oxide film present between the metal magnetic particle and the underlayer is present at a surface of a metal magnetic particle adjacent to the metal magnetic particle positioned at the interface.

<13> The coil component described in any one of <9> to <12>, in which the underlayer does not contain a glass component.

<14> The coil component described in any one of <9> to <13>, in which the oxide film present between the metal magnetic particle and the underlayer contains Zn, and the Zn is unevenly distributed on the side of the underlayer.

<15> The coil component described in any one of <9> to <14>, in which, at an interface between the magnetic body and the coil, an oxide film having a thickness smaller than the thickness of the oxide film present between the metal magnetic particle and the underlayer is present between the metal magnetic particle and the coil.

<16> The coil component described in <15>, in which the oxide film present between the metal magnetic particle and the coil is present at a surface of the metal magnetic particle positioned at the interface between the magnetic body and the coil, the surface being on the side of the coil.

What is claimed is:

1. A coil component comprising:

a magnetic body containing a plurality of metal magnetic particles;

a coil embedded in an inside of the magnetic body; and an outer electrode provided at at least a bottom surface of the magnetic body and electrically connected to the coil, wherein the outer electrode includes, in order from a side of the magnetic body, an underlayer containing Ag, and a plating layer, at an interface between the magnetic body and the underlayer, an oxide film containing a metal element contained in the plurality of the metal magnetic particles is present between a metal magnetic particle positioned at the interface and the underlayer, and in an inside of the magnetic body, an oxide film having a thickness smaller than a thickness of the oxide film between the metal magnetic particle positioned at the interface and the underlayer is present at a surface of a metal magnetic particle adjacent to the metal magnetic particle positioned at the interface, wherein the thickness of the oxide film between the metal magnetic particle positioned at the interface and the underlayer is 200 nm or more.

2. The coil component according to claim 1, wherein the oxide film between the metal magnetic particle and the underlayer is at a surface of the metal magnetic particle positioned at the interface between the magnetic body and the underlayer, the surface being on a side of the underlayer.

3. The coil component according to claim 1, wherein the underlayer is absent of a glass component.

4. The coil component according to claim 1, wherein the oxide film between the metal magnetic particle and the underlayer contains Zn, and the Zn is unevenly distributed on a side of the underlayer.

5. The coil component according to claim 1, wherein at an interface between the magnetic body and the coil, an oxide film having a thickness smaller than a thickness of the oxide film between the metal magnetic particle and the underlayer is between the metal magnetic particle and the coil.

6. The coil component according to claim 5, wherein the oxide film between the metal magnetic particle and the coil is at a surface of the metal magnetic particle positioned at the interface between the magnetic body and the coil, the surface being on a side of the coil.

7. The coil component according to claim 2, wherein the underlayer is absent of a glass component.

8. The coil component according to claim 2, wherein the oxide film between the metal magnetic particle and the underlayer contains Zn, and the Zn is unevenly distributed on a side of the underlayer.

* * * * *